(12) United States Patent
Aizawa et al.

(10) Patent No.: US 8,350,015 B2
(45) Date of Patent: Jan. 8, 2013

(54) CYANINE DYE

(75) Inventors: Yasushi Aizawa, Okayama (JP); Yoshinori Koyama, Okayama (JP); Ayashi Noguchi, Okayama (JP)

(73) Assignee: Kabushiki Kaisha Hayashibara Seibutsu Kagaku Kenkyujo, Okayama (JP)

( * ) Notice: Subject to any disclaimer, the term of this patent is extended or adjusted under 35 U.S.C. 154(b) by 682 days.

(21) Appl. No.: 10/590,895

(22) PCT Filed: Feb. 24, 2005

(86) PCT No.: PCT/JP2005/002978
§ 371 (c)(1),
(2), (4) Date: Jun. 13, 2007

(87) PCT Pub. No.: WO2005/083011
PCT Pub. Date: Sep. 9, 2005

(65) Prior Publication Data
US 2008/0000034 A1    Jan. 3, 2008

(30) Foreign Application Priority Data

Feb. 27, 2004 (JP) ................................ 2004-053528
Mar. 8, 2004 (JP) ................................ 2004-063296
Jun. 11, 2004 (JP) ................................ 2004-173653

(51) Int. Cl.
*C09B 69/02* (2006.01)
*C09B 23/04* (2006.01)
*C09B 45/20* (2006.01)

(52) U.S. Cl. ... 534/707; 548/427; 548/455; 430/270.18; 430/270.2; 430/270.21

(58) Field of Classification Search .................. None
See application file for complete search history.

(56) References Cited

U.S. PATENT DOCUMENTS

| 4,767,693 A * | 8/1988 | Oba et al. ............ 430/270.19 |
| 5,958,650 A * | 9/1999 | Wolleb et al. ......... 430/270.19 |
| 6,071,672 A * | 6/2000 | Namba et al. .......... 430/270.18 |
| 6,168,843 B1 * | 1/2001 | Kambe et al. ............. 428/64.1 |
| 6,525,181 B2 * | 2/2003 | Kasada et al. ............... 534/707 |
| 6,683,188 B1 * | 1/2004 | Kasada et al. .................. 548/181 |
| 6,743,568 B2 * | 6/2004 | Hohsaka et al. ........ 430/270.19 |
| 7,402,375 B2 * | 7/2008 | Kasada et al. ............. 430/270.2 |
| 2001/0044074 A1 * | 11/2001 | Hohsaka et al. ........ 430/270.21 |
| 2005/0226135 A1 * | 10/2005 | Morita et al. ............ 369/275.4 |
| 2005/0227178 A1 * | 10/2005 | Morita et al. ............ 430/270.18 |
| 2007/0280095 A1 * | 12/2007 | Yoshida et al. ............ 369/275.4 |
| 2007/0281123 A1 * | 12/2007 | Umezawa et al. .......... 428/64.4 |

FOREIGN PATENT DOCUMENTS

| EP | 0 887 202 A1 | 12/1998 |
| EP | 1 178 083 A1 | 2/2002 |
| EP | 1 347 030 A1 | 9/2003 |
| EP | 2 116 577 A1 | 11/2009 |
| JP | 11116611 A | 4/1999 |
| JP | 2002202592 A | 7/2002 |
| JP | 2003/167343 A | 6/2003 |
| WO | 98/29257 A1 | 7/1998 |
| WO | 00/75111 A1 | 12/2000 |
| WO | 01/44374 A1 | 6/2001 |
| WO | 02/50210 A1 | 6/2002 |

OTHER PUBLICATIONS

Sun et al., "Optical and Thermal Properties of a Cyanine Dye Medium for Next-Generation DVD-Rs", The Imaging Science Journal, 47(2), 113-117, 1999.*

* cited by examiner

*Primary Examiner* — Fiona T Powers

(57) ABSTRACT

An objective of this invention is to extend the range of choosing organic dye compounds as radiation-absorbing agents in a variety of fields by providing a novel organic dye compound which absorbs short-wavelength visible radiation and exhibits a superior in optical resistance, solubility in solvents, and heat characteristics required in a novel field in which the organic dye compound is applied: The objective is attainable by providing a cyanine dye which has a specific structure and exhibits a major adsorption maximum at a wavelength longer than 400 nm in a solution.

3 Claims, No Drawings

CYANINE DYE

TECHNICAL FIELD

This invention relates to a cyanine dye, particularly, to a novel monomethine cyanine dye which absorbs short-wavelength visible radiation.

BACKGROUND ART

In this age of the growing importance of information, there is a great urgent demand for organic dye compounds which absorb short-wavelength visible radiation. Their application is now extending beyond conventional field, for example, filter material which solely utilize the visible radiation-absorbing and shielding property of such an organic dye compound, towards the field of information storage and solar power generation which utilize energy of visible radiation by such an organic dye compound.

The properties required for organic dye compounds to be subjected to such a use are to be appropriate with respect to optical absorption characteristic at short-wavelength visible region, large with respect to optical resistance, with respect to solubility in solvents and also with respect to heat characteristic according to its use Typical organic dye compounds as proposed heretofore are, for example, anthraquinone, phthalocyanine and cyanine dyes (see, for example, Japanese Patent Kokai Nos. 116611/99, 202592/02 and 167343/03): Among these, anthraquinone dye has been deemed to be disadvantageous with respect to optical absorption characteristic, while phthalocyanine dye, disadvantageous with respect to both optical absorption characteristic and solubility in solvents. Although cyanine dye is advantageous in both optical absorption characteristic and solubility, conventional cyanine dye has the demerit that it is poorer with respect to optical resistance and heat characteristic.

In view of such situation, the objective of this invention is to provide a novel organic dye compound which adsorbs short-wavelength visible radiation, superior in optical resistance and also in solubility in solvents and exhibits heat characteristic required in a novel field using the organic dye compound so as to extend the range of choosing organic dye compounds as radiation-absorbing organic material in the fields as described above.

DISCLOSURE OF INVENTION

The present inventors extensively studied and screened cyanine dyes, a type of dye which had been deemed to be inferior in optical resistance and heat characteristic, leading to a monomethine cyanine dye which bears indolenine rings at both ends of monomethine chain and also an azometallic complex as counter ion. Also it was found that such cyanine dye absorbs visible radiation at violet to green region and exhibits an elevated optical resistance, a remarkable solubility in various organic solvents with no practical obstacles, and a satisfactory heat characteristic. Therefore, it was found that such cyanine dye is advantageously feasible as a novel radiation-absorbing material directed to absorb short-wavelength visible radiation so as to shield it or to convert it into energy in a variety of fields which need organic dye compounds with such a property.

Thus, this invention attains the above described objective by providing a cyanine dye represented by General Formula 1.

General Formula 1:

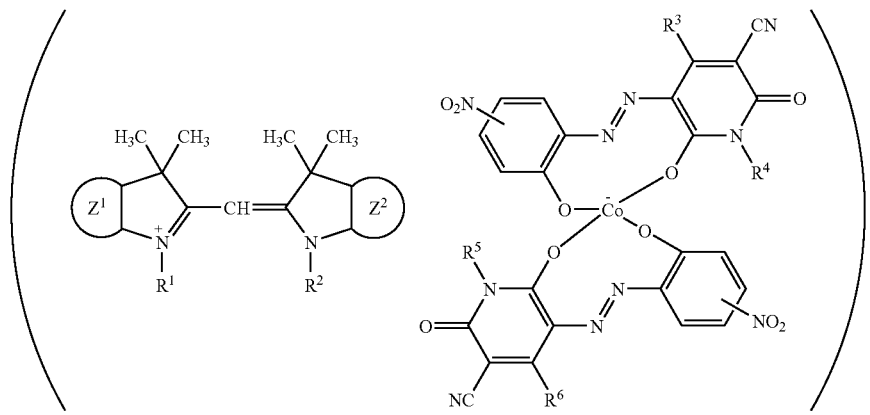

(In General Formula 1, $Z^1$ and $Z^2$ mean monocyclic or condensed heterocyclic aromatic rings which are the same or different each other. $R^1$ to $R^6$ independently denote aliphatic hydrocarbon group and their aliphatic hydrocarbon groups may bear a substituent.)

PREFERRED EMBODIMENT FOR CARRYING OUT THE INVENTION

As described above, the present invention relates to a cyanine dye represented by General Formula 1.

General Formula 1:

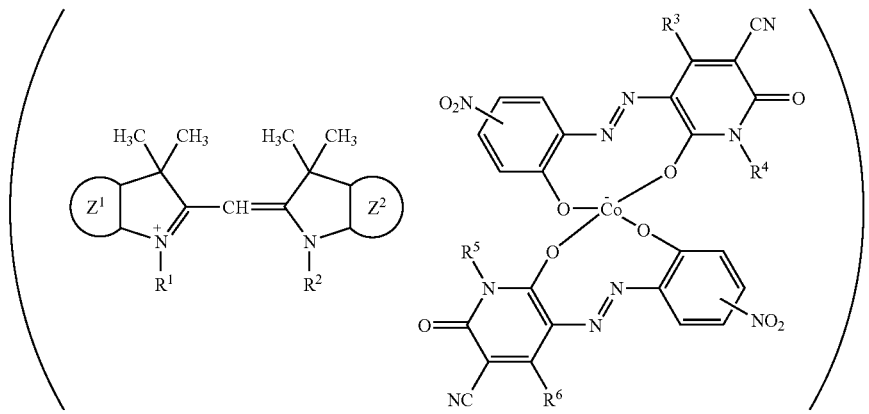

In General Formula 1, $Z^1$ and $Z^2$ mean monocyclic or condensed heterocyclic aromatic rings which are the same or different each other, for example, benzene ring, naphthalene ring, azulene ring, and fluorine ring. The aromatic ring may bear one or more substituents. Particular substituents are, for example, aliphatic hydrocarbon groups such as methyl, ethyl, propyl, isopropyl, isopropenyl, 1-propenyl, 2-propenyl, 2-propynyl, butyl, isobutyl, sec-butyl, tert-butyl, 2-butenyl, 1,3-butadienyl, pentyl, isopentyl, neopentyl, tert-pentyl, 1-methylpentyl, 2-methylpentyl, and 2-penten-4-ynyl groups; alicyclic hydrocarbon groups such as cyclopropyl, cyclobutyl, cyclopentyl, cyclopentenyl, cyclohexyl and cyclohexenyl groups; aromatic hydrocarbon groups such as phenyl, o-tolyl, m-tolyl, p-tolyl, xylyl, mesityl, o-cumenyl, m-cumenyl, p-cumenyl, and biphenyl groups; ether groups such as methoxy, ethoxy, propoxy, isopropoxy, butoxy, isobutoxy, sec-butoxy, tert-butoxy, pentyloxy, and phenoxy groups; ester groups such as methoxycabonyl, ethoxycabonyl, propoxycabonyl, acetoxy, and benzoyloxy groups; amino groups such as dimethylamino, diethylamino, dipropylamino, diisopropylamino, dibutylamino, and dipentylamino groups; halogen groups such as fluoro, chloro, bromo and iodo groups; hydroxyl group; carboxy group; cyano group; nitro group; and combinations thereof. $R^1$ to $R^6$ in General Formula 1 independently denote aliphatic hydrocarbon groups which may bear one or more substituents. $R^1$ to $R^3$ independently denote linear or branched aliphatic hydrocarbon groups with a carbon number of 5 or less, such as methyl, ethyl, propyl, isopropyl, butyl, isobutyl, sec-butyl, tert-butyl, 2-butenyl, 1,3-butadienyl, pentyl, isopentyl, neopentyl, tert-pentyl, and 2-pentene-4-inyl groups. One or more hydrogen atoms in such an aliphatic hydrocarbon group may be substituted with a halogen group such as fluoro, chloro and bromo groups.

Although in General Formula 1, the position of two nitro groups in the azometallic complex anion is not restricted to particular of ortho-, meta- and para-positions with respect to the azo group, meta-position is preferable from the viewpoint of synthesis. Dependently on types of solvent, for example, the solubility of the dye in organic solvents is usually becomes higher as the carbon length in $R^3$ to $R^6$ becomes larger.

Chemical Formulae 1 to 13 are illustrative for the cyanine dye according to this invention. Since these usually absorb a radiation with a wavelength longer than 400 nm in a solution and exhibit an absorption maximum at a wavelength around 430 to 550 nm in the near violet to the green region with an elevated molecular absorption coefficient ($1 \times 10^4$ or larger, usually, $4 \times 10^4$ or larger) at the absorption maximum wavelength, they efficiently absorb a visible radiation at the violet to green region. Dependently on uses, cyanine dyes represented by Chemical Formulae 1 to 8 are feasible in a variety of fields which need organic dye compounds with an absorbability to relatively short-wavelength visible radiation, while those represented by Chemical Formulae 9 to 13, in fields which need organic compounds with an absorbability to relatively long-wavelength visible radiation.

Chemical Formula 1:

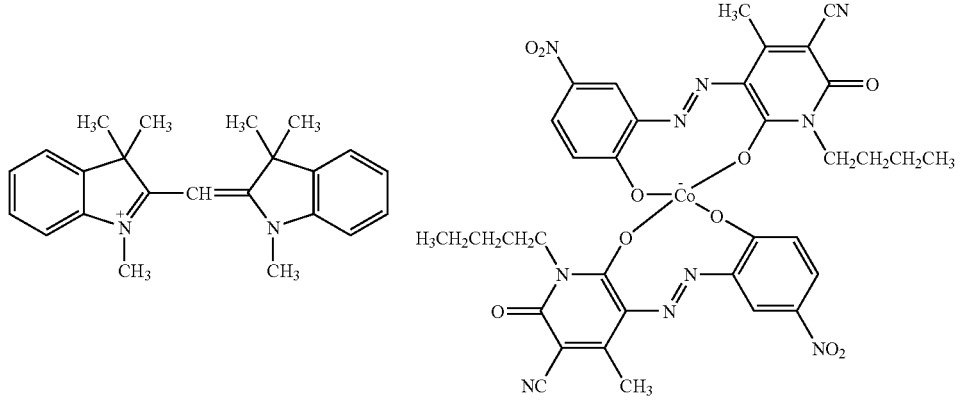

Chemical Formula 2:
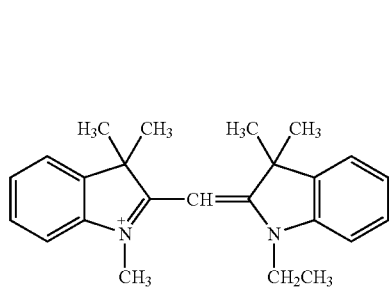 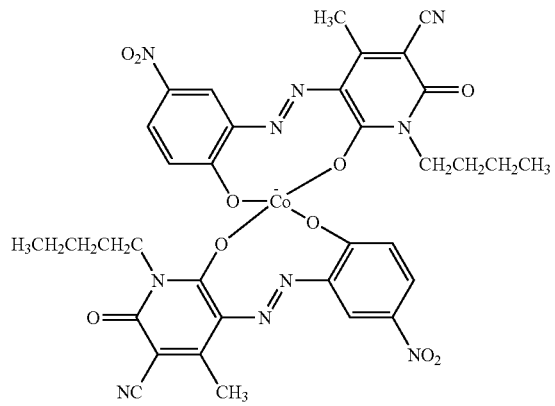
Chemical Formula 3:
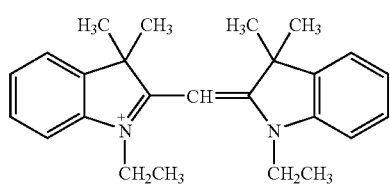 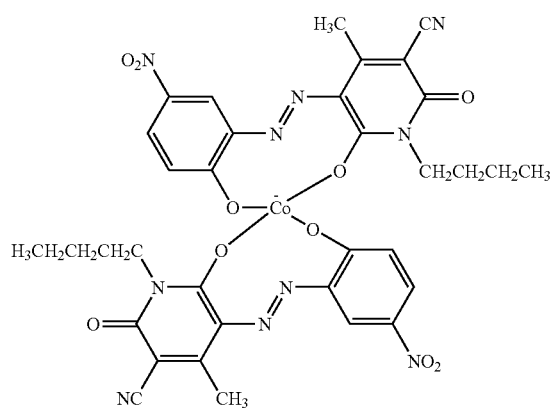
Chemical Formula 4:
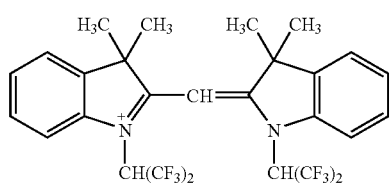 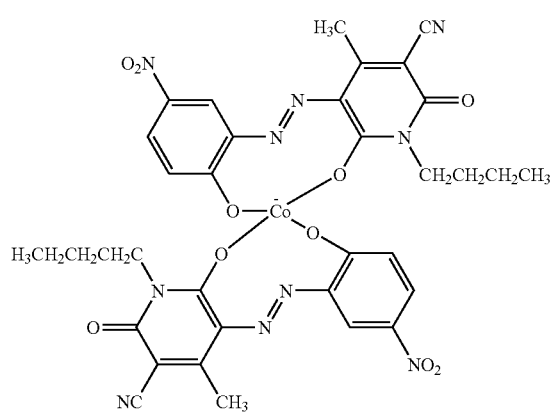

Chemical Formula 5:
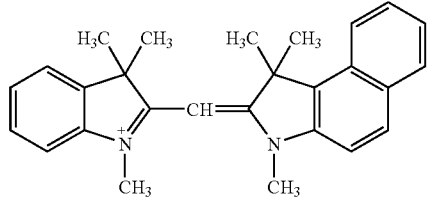 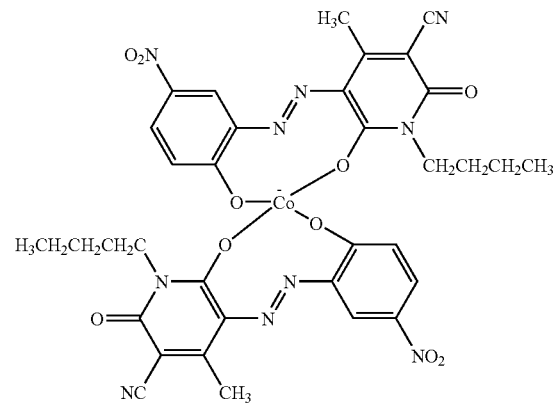
Chemical Formula 6:
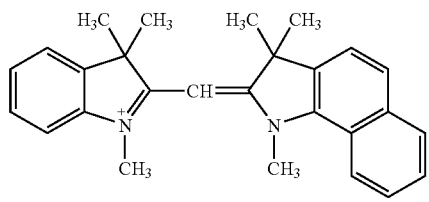 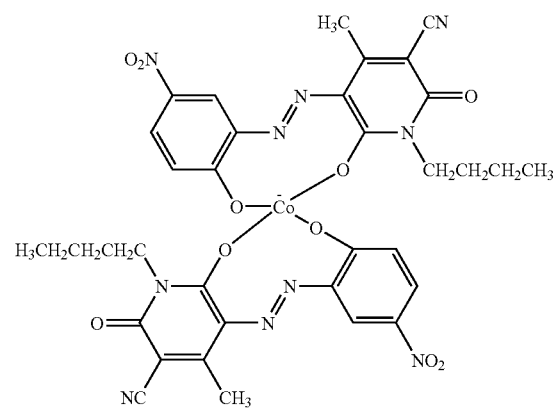
Chemical Formula 7:
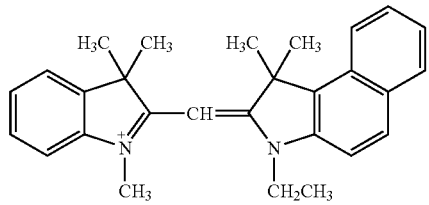 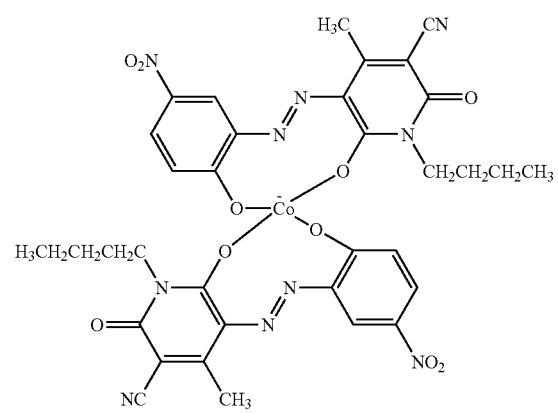

-continued
Chemical Formula 8:
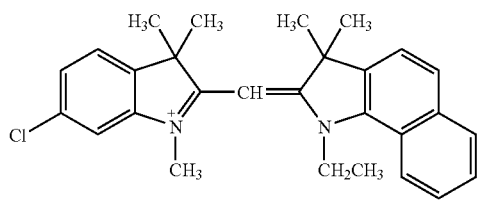 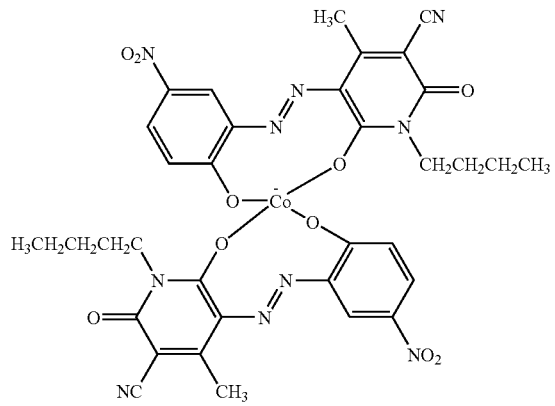
Chemical Formula 9:
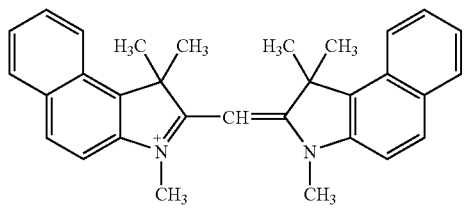 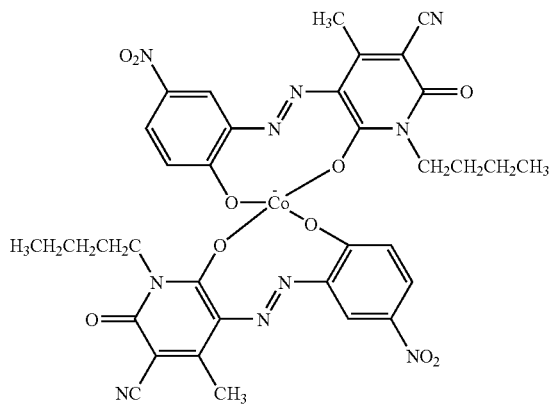
Chemical Formula 10:
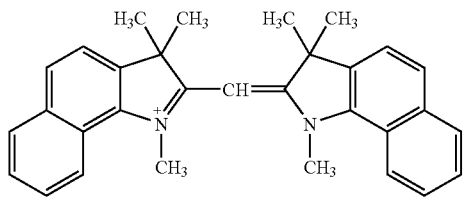 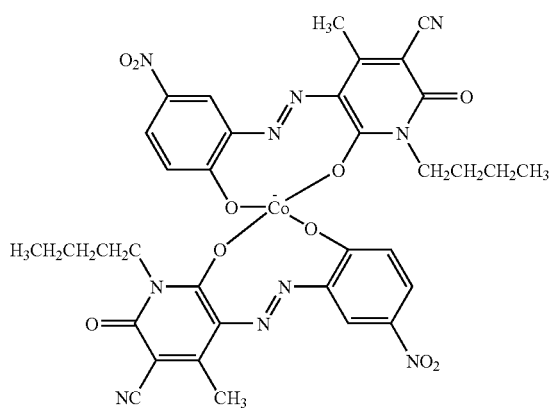

Chemical Formula 11:

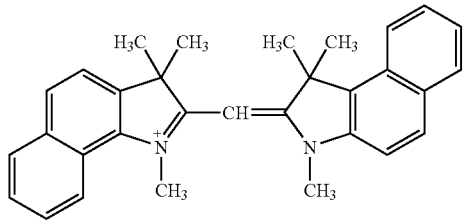 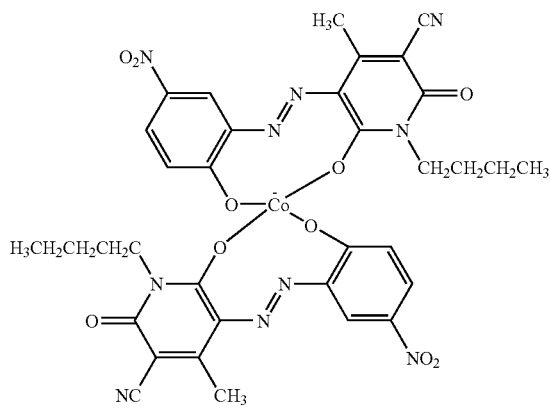

Chemical Formula 12:

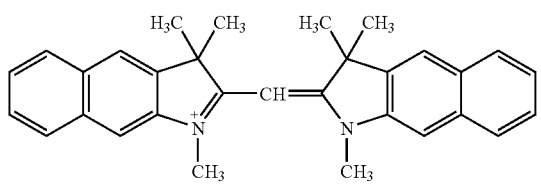 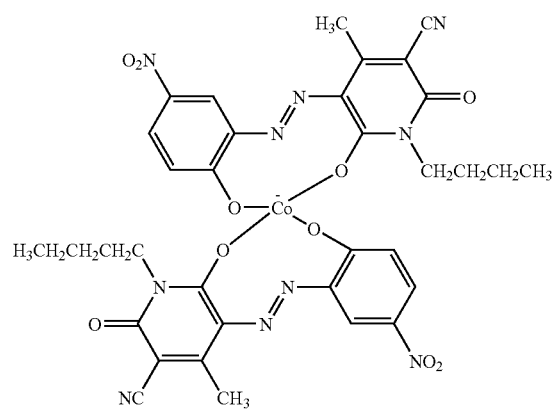

Chemical Formula 13:

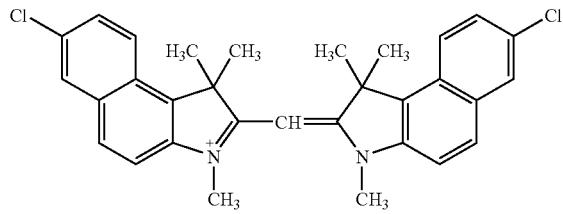 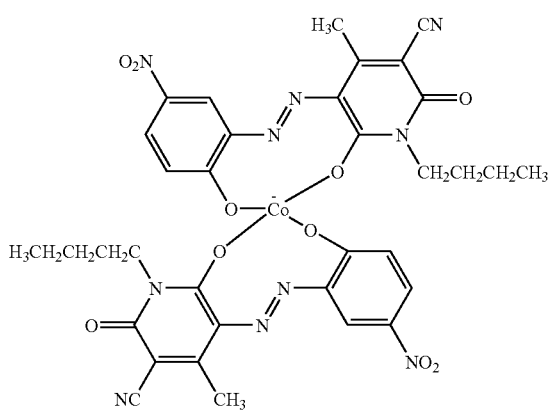

A cyanine dye represented by General Formula 1 of this invention can be synthesized in a desired amount, for example, by allowing to react a chemical compound represented by General Formula 2, which bears $Z^1$, $Z^2$, $R^1$ and $R^2$ correspondingly with General Formula 1, with a chemical compound represented by General Formula 3, which bears $R^3$ to $R^6$ correspondingly with General Formula 1. The symbol "$X^1$" in General Formula 2 denotes, for example, an appropriate anion such as inorganic acid ion including fluoride, chloride, bromide, iodide, fluorate, chlorate, bromate, iodate, perchlorate, phosphate, hexafluorophosphate, hexafluoroantimonate, hexafluorostannate, boronhydrofluorate and tetrafluoroboronate and organic acid ion including thiocyanate, benzene sulfonate, naphthalene sulfonate, benzene carbonate, alkyl carbonate, trihaloalkyl carbonate, alkyl sulfonate, trihaloalkyl sulfonate, nicotinate, and tetracyanoquinodimethane. The symbol "$X^2$", in General Formula 3 denotes an appropriate cation, for example, onium ions such as alkylammonium, pyridinium and quinolinium.

General Formula 2:

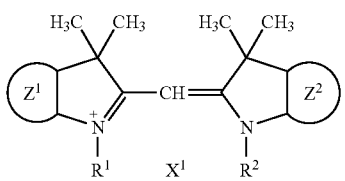

General Formula 3:

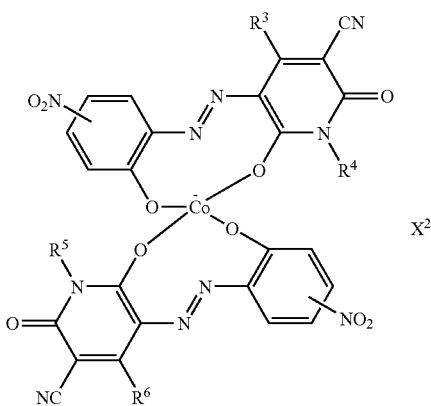

In such a synthesis, an adequate amount of a compound represented by General Formula 2 and another compound represented by General Formula 3 are placed in a reaction vessel, dissolved in an appropriate solvent, if necessary, and allowed to react at ambient or higher temperature while heating and stirring such as refluxing.

As to solvents, there are feasible distinct type of hydrocarbons such as pentane, hexane, cyclohexane, petroleum ether, octane, petroleum benzin, isooctane, benzene, toluene and xylene; halides such as carbon tetrachloride, chloroform, 1,2-dichloroethane, 1,2-dibromoethane, trichloroethylene, tetrachloroethylene, chlorobenzene, bromobenzene, and α-dichlorobenzene; alcohols and phenols such as methanol, ethanol, 2,2,2-trifluoro ethanol, 1-propanol, 2-propanol, 1-butanol, 2-butanol, isobutyl alcohol, isopentyl alcohol, cyclohexanol, ethylene glycol, propylene glycol, 2-methoxyethanol, 2-ethoxyethanol, phenol, benzyl alcohol, cresole, diethylene glycol, triethylene glycol and glycerin; ethers such as diethyl ether, diisopropyl ether, tetrahydrofuran, tetrahydropyran, 1,4-dioxane, anisole, 1,2-dimethoxyethane, diethylene glycol dimethyl ether, and dicyclohexyl-18-crown-6, methylcarbitol, ethylcarbitol; acids and acid derivatives such as acetic acid, acetic anhydride, trichloroacetic acid, trifluoroacetic acid, ethyl acetate, butyl acetate, ethylene carbonate, propylene carbonate, formamide, N-methylformamide, N,N-dimethylformamide, N-methylacetoamide, N,N-dimethylacetoamide, and hexamethylphosphoric triamide phosphoric triethyl; nitriles such as acetonitrile, propionitrile, succinonitrile and benzonitrile; nitro compounds such as nitromethane and nitrobenzene; sulfur-containing compounds such as dimethylsulfoxide and sufolane; and water, which may be used in combination, if necessary.

In case of using solvents, generally, a larger amount of solvent leads to a less reaction efficiency, while a less amount of solvent, a more difficulty in homogenous heating and stirring and also in a more liability to side reactions. Thus, it is desirable to set the amount of solvent to a level of 100-folds or less, usually, 5 to 50-folds by weight of the total amount of starting compounds to be used. The reaction completes within 10 hours, usually, within 5 hours, dependently upon the type of starting compounds and reaction conditions. The progress of reaction can be monitored by conventional method, for example, thin layer chromatography, gas chromatography and high-performance liquid chromatography. The cyanine dye of this invention can be obtained in a desired amount by or in accordance with such a process. Each compound represented by General Formula 2 and 3 can be obtained according to the method described in "KANKO SHIKISO", edited by Masaaki Hayami, published by Sangyo Tosho in 17, Oct. 1997, pp 24-30: In case that such compounds are commercially available, one may purify them prior to use, if necessary.

The cyanine dye thus obtained can be used in reaction mixture form, dependently on its uses. However, prior to uses, the cyanine dye isusuallypurifiedwithamethod-whichisusuallyemployedinthepurification of analogous compounds, such as dissolution, extraction, separation, decantation, filtration, concentration, thin layer chromatography, column chromatography, gas chromatography, high-performance liquid chromatography, distillation, sublimation and crystallization: These methods may be applied in combination, if necessary. Dependently upon the type and application field of cyanine dye, it is desirable to highly purify it by means of, for example, distillation, crystallization and/or sublimation, prior to its use.

Since as described heretofore, the cyanine dye of this invention exhibits a major absorption maximum at a wavelength longer than 400 nm, usually in the violet to green region around 430 to 550 nm and an elevated molecular absorption coefficient ($1\times10^4$ or larger, usually, $5\times10^4$) at the absorption maximum wavelength (molecular absorption coefficient at the absorption maximum wavelength may be abbreviated as "ε" hereinafter), they efficiently absorb short-wavelength visible radiation. Further, the cyanine dye of this invention is superior in heat characteristic to exhibit a melting or degrading point at a temperature higher than 200° C., as well as exhibiting a remarkable solubility with no practical obstacles inorganic solvents, for example, amides, alcohols, ketones, ethers, esters, hydrocarbons, nitriles and halides which are usually used in the field of, for example, information storage and solar power generation. As well known, melting point or degrading point of organic compounds has been deemed to be an important merkmal for heat characteristic. Melting point or degrading point of organic compounds such as cyanine dye can be determined, for example, by conventional differential scanning calorimetry (abbreviated as "DSC", hereinafter). Because of these features, the cyanine dye of this invention is very useful as a radiation-absorbing material which is to shield short-wavelength visible radiation or to convert it into energy by absorption in a variety of fields of, for example, information storage, printing, printed-circuit, solar power generation, electric machinery apparatus, electric communication apparatus, optical apparatus, cloth, building/bedding/decorating product, sanitary and health product and agricultural material.

In the field of information storage, the cyanine dye of this invention is useful as sensitizer and opto-thermal converting agent which are directed to absorb short-wavelength visible radiation so as to accelerate the polymerization or sensitization of polymerizable compounds or polymerization initiators in optical card, printing plate, thermal copy and thermal recording. Since the absorption maximum wavelength of cyanine dyes of this invention is usually close to an oscillation wavelength of conventional visible lasers, for example, gas lasers such as argon ion laser, krypton ion laser and helium-neon laser; semiconductor laser such as Cds laser; solid laser such as distributed feedback or Bragg reflection Nd—YAG laser, with an oscillation line around 500 nm, particularly, 450 to 550 nm, the cyanine dye of this invention is extremely useful as a photosensitizer in photo-polymerizable compositions using such visible laser, mercury lamp, metal halide lamp and xenon lamp as exposure in various fields, for example, information storage such as thin membrane- and volume holograms; printing such as offset reproduction, photogravure engraving, screen reproduction, direct plate making, digital direct plate making and flexographic printing; inks for printed-circuit such as etching resist ink, coated resist ink, solder resist ink and character ink; electrograph such as copy-machine, facsimile and printer; photo interconnecting technology such as photo surface-mount technology (photo SMT) and self-generated connection technology (photo soldering); paints, adhesives, packaging materials, dental materials.

As to additional uses as sensitizer, for example, in the field of solar power generation, the cyanine dye of this invention is engaged on the surface of semiconductor electrodes in dye-sensitized solar cells so that the sensitivity of semiconductor electrodes against short-wavelength visible radiation becomes larger to remarkably improve their opto-electric conversion efficiency. Since the cyanine dye of this invention exhibits a large optical resistance with no practical obstacles against environmental lights such as natural- and artificial lights, solar cells using the cyanine dye of this invention as photosensitizer have a practical merit when used over an extended time period, they are consistently liable to any electromotive force decay which may be caused by photosensitizers.

In the field of electric communication apparatus, electric machinery apparatus and optical apparatus, the cyanine dye of this invention has practical merits that it reduces noises from visible radiation and the elevation of ambient temperature by heat radiation, as well as that it adjusts visual sensitivity to give a desired level when applied as filter material to, for example, image pick-up tube, photo-detecting semiconductor device and optical fiber. As to additional uses as filter material, in the field of agricultural material, the dye is feasible to control the wavelength distribution of light coming to useful plants such as ornamental, garden plants, edible plants and pharmaceutical plants including fruit trees cereals, vegetables and flowers so as to regulate their growth when applied to, for example, glass or plastic material in plate, sheet or film form in greenhouse.

In addition to uses as described above, the cyanine dye of this invention can be used, if necessary, in combination with one or more other materials capable of absorbing light in the ultraviolet, visible and/or infrared region as light shielding agent, heat shielding agent, heat insulating agent or heat accumulating agent, in clothes in general, in particular, those with heat insulating and heat accumulating fiber or those with fibers which exhibit a camouflaging ability against ultraviolet, visible or infrared reconnaissance, as well as in other products, for example, building/bedding/decorating products such as a drape, pleat, shirring, lace, casement, print, venetian blind, roller blind, roman shade, shutter, shop curtain, blanket, "futon (a set of Japanese mattress and quilts placed on the tatami floor for use as a bed)", "futon-ji (cloth for use in futon)", cover for "futon", bed sheet, "zabuton (a Japanese cushion)", pillow, pillow cover, cushion, mat, carpet and sleeping bag, interior and exterior materials for use in windowpane, building, car, automobile, train, ship and airplane, wind glasses; sanitary and health products such as paper diaper, diaper cover, eyeglasses, monocle and lorgnette, shoe insoles, shoe internal base sheets, materials for use in bags, "furoshiki (Japanese wrapping cloth)", materials for umbrellas, parasols, stuffed toys; filters, panels and screens for lighting apparatuses and information display apparatuses using cathode-ray tube display, liquid crystal display, plasma display and electro luminescence display; sunglasses, sun visors, sunroofs, windows of gas oven and microwave oven, and wrapping materials, bottles and containers for use to wrap, such a product, the dye has practical merits that it prevents or reduces in living bodies and products their damage and trouble such as undesirable temperature variation and eye strain, decay of visual cells and cataract where excess visible radiation is one of their causes, as well as that it adjusts chromaticity, color, color tone, touch and appearance of such a product and also a reflected or transmitted light from such a product to a desired color balance. Like conventional organic compound which absorbs visible radiation, the cyanine dye of this invention is useful in inalterable ink, inalterable and falsifiable bar code ink, visible radiation-absorbing ink, visible radiation-absorbing paint, marking agent to position photographs and films, classifying dye for use in recycling plastics and preheating auxiliary for use in processing and molding PET bottles, as well as effective ingredient in pharmaceuticals directed to treat visible radiation sensitive tumors in general.

Although the cyanine dye of this invention exhibits a remarkable optical resistance, it may be used with one or more optical resistance-improving agents (quenchers) when subjected to the uses described above, for the purpose of inhibiting color degradation, deterioration, denaturation and decomposition of the cyanine dye caused, for example, by singlet oxygen which may generated by irradiating laser. Optical resistance-improving agents which are usable in combination with the cyanine dye of this invention are, for example, amine compounds, carotene compounds, sulfide compounds, phenol compounds, and metallic complexes such as transition metal chelate of acetylacetnate, salicylaldehydeoxime, dithiol, thiocatechonal chelate, thiobisphenolate chelate, bis-dithio-α-diketone chelate and formazan, described in International Application No. WO 00/075111 applied by the same applicant of this invention; "SHIKISAI KOGAKU HANDBOOK (Handbook of Color Engineering)" 1st edition, pp 1, 274-1,282, edited by Color Material Association, published by ASAKURA SHOTEN at 15 Nov. 1989; and Masahiro Shinkai et al., "SENRYO-TO-YAKU-HIN (Dye compounds and Chemicals)", Vol. 37, No. 7, 185-197 (1992); which may be used in combination, if necessary Among them, formazan and dithiol metallic complexes are much more preferable because they significantly improve optical resistance of the cyanine dye of this invention and forma satisfactory amorphous solid in the form of mixture with the cyanine dye of this invention. The amount of optical resistance-improving agent used together with the cyanine dye is, usually, 1 w/w % or more, preferably, 3 to 30 w/w % to the cyanine dye. In the case of using optical resistance-improving agent, the cyanine dye of this invention can be premixed with the optical resistance-improving agent into a liquid, semisolid or solid composition form and then applied to the objective products. Alternatively, the cyanine dye of this invention and the optical resistance-improving agent can be separately prepared into a liquid, semisolid or solid form and applied to the objective products to give a prescribed composition.

Several embodiments according to this invention will be explained with reference to the following Examples.

Example 1

Cyanine Dye

Twenty milliliters of acetonitrile was placed in a reaction vessel, admixed with 2.0 g of the compound represented by Chemical Formula 14 and 3.5 g of the compound represented by Chemical Formula 15, and allowed to react while heating and refluxing for 20 minutes. After evaporating the solvent from the reaction mixture, an appropriate amount of ethanol was added to the reaction mixture and then refluxed for 30 minutes. By cooling the reaction mixture, 3.9 g of cyanine dye of this invention, represented by Chemical Formula 1, was obtained in a dark purple crystal form.

Chemical Formula 14:

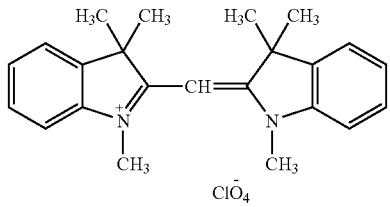

Chemical Formula 15:

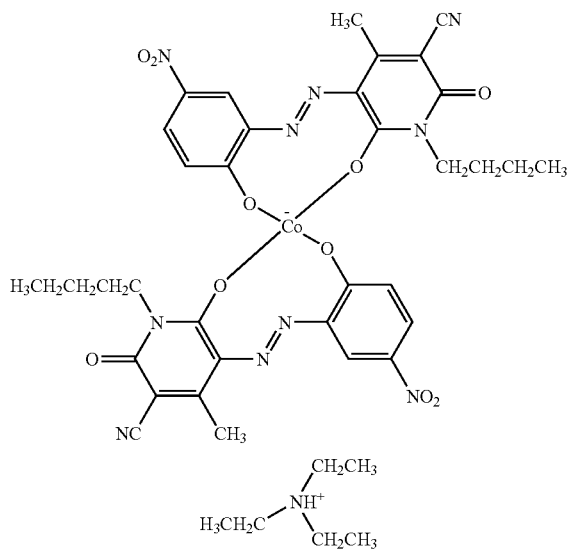

A part of the crystal was sampled and determined for melting point and decomposition point by DSC as a heat characteristic, revealing that the cyanine dye in this Example gave the decomposition point around 245° C. which is indistinguishable from melting point. Further, upon determining visible absorption spectrum in methanol in usual manner, the cyanine dye in this Example showed an absorption maximum ($\epsilon$=6.94×10$^4$) at violet to blue region, a wavelength around 447 nm. When determining solubility in organic solvents at 20° C. in usual manner, the cyanine dye in this Example exhibited a remarkable solubility with no practical obstacles in organic solvents, for example, amides, alcohols, ketones, nitriles and halides such as N,N-dimethylformamide, methanol, 2,2,3,3-tetrafluoro-1-propanol (abbreviated as "TFP", hereinafter) ethyl-methyl-ketone, acetonitrile, and chloroform. Upon determining $^1$H-nuclear magnetic resonance spectrum (abbreviated as "$^1$H-NMR spectrum", hereinafter) in chloroform-d, the cyanine dye in this Example showed peaks at chemical shifts δ (ppm, TMS) of 0.51 (t, 6H), 0.83 (m, 4H), 0.97 (m, 4H), 1.64 (s, 12H), 2.93 (s, 6H), 3.38 (s, 6H), 3.62 (t, 4H), 5.40 (s, 1H), 6.82 (d, 12H), 7.26 to 7.49 (m, 8H), 8.00 (d, 2H), and 9.12 (s, 2H). The material compound represented by chemical Formula 14 exhibited a radiation absorption property similar to the cyanine dye in this Example; the material compound, however, gave the decomposition point around 210° C. which is indistinguishable from melting point, which was significantly lower than that of the cyanine dye in this Example.

The cyanine dye in this Example, which efficiently absorbs a short-wavelength visible radiation and exhibits a superior solubility in solvents and heat characteristic, is useful as radiation-absorbing organic material to shield short-wavelength radiation or to convert it into energy by absorption in a variety of fields of, for example, information storage, solar power generation, electric machinery apparatus, electric communication apparatus, optical apparatus, cloth, building/bedding/decorating product, sanitary and health product and agricultural material.

Example 2

Cyanine Dye

The compound represented by Chemical Formula 16 in place of the compound represented by chemical Formulae 14, were allowed to react similarly as in Example 1 to obtain the compound represented by Chemical Formula 9 in a dark green crystal form.

Chemical Formula 16:

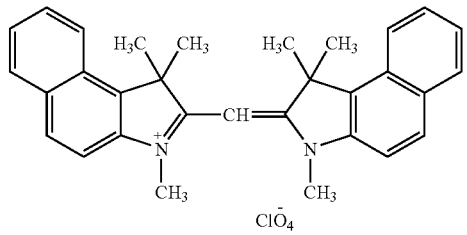

A part of the crystal was sampled and determined for melting point and decomposition point by DSC as a heat characteristic, revealing that the cyanine dye in this Example gave the decomposition point around 305° C. which is indistinguishable from melting point. Further, upon determining visible absorption spectrum in methanol in usual manner, the cyanine dye in this Example showed an absorption maximum ($\epsilon$=9.03×10$^4$) at violet to blue region, a wavelength around 473 nm. When determining solubility in organic solvents at 20° C. in usual manner, the cyanine dye in this Example exhibited a remarkable solubility with no practical obstacles in organic solvents, for example, amides, alcohols, ketones, nitriles and halides such as N,N-dimethylformamide, methanol, 2,2,3,3-tetrafluoro-1-propanol (abbreviated as "TFP", hereinafter) ethyl-methyl-ketone, acetonitrile, and chloroform. Upon determining $^1$H-nuclear magnetic resonance spectrum (abbreviated as "$^1$H-NMR spectrum", hereinafter) in chloroform-d, the cyanine dye in this Example showed peaks at chemical shifts δ (ppm, TMS) of 0.48 (t, 6H), 0.73 to 0.85 (m, 4H), 0.91 to 1.00 (m, 4H), 1.94 (s, 12H), 2.85 (s, 6H), 3.50 (s, 6H), 3.57 (t, 4H), 5.62 (s, 1H), 6.83 (d, 2H), 7.51 to 7.61 (m, 4H), 7.70 (t, 2H), 7.97 to 8.02 (m, 6H) 8.11 (d, 2H), and 9.11 (s, 2H). The material compound represented by chemical Formula 16 exhibited a radiation absorption property similar to the cyanine dye in this Example, the material compound, however, gave the decomposition point around 270° C. which is indistinguishable from melting point, which was significantly lower than that of the cyanine dye in this Example.

The cyanine dye in this Example, which efficiently absorbs short-wavelength visible radiation and exhibits superior solubility in solvents and heat characteristic, is useful as radiation-absorbing organic material to shield short-wavelength radiation or to convert it into energy by absorption in a variety of fields of, for example, information storage, solar power generation, electric machinery apparatus, electric communication apparatus, optical apparatus, cloth, building/bedding/decorating product, sanitary and health product and agricultural material.

Although starting conditions and yields are slightly different for respective cyanine dyes, the cyanine dyes of this invention, including those represented by Chemical Formulae 1 to 13 but not specifically illustrated in the above described Examples, can be obtained in a desired amount by either method in Example 1 and 2 or according thereto.

Experiment

Optical Resistance of Cyanine Dye

Fifteen mg of either cyanine dye represented by Chemical Formulae 1 or 9, obtained by the method in Example 1 or 2, was added to 3 ml of TFP, followed by ultrasonically dissolution. The resulting solution was poured dropwise on one side of a polished glass plate (5 cm×5 cm) and homogenously spread over the surface of the plate by turning the plate at 1,000 rpm for one minute. Successively, thin membrane of the cyanine dye in this invention was formed on the glass plate by drying in the ventilation of warm and cooled air in this order. Immediately after determining optical transmittance ($T_0$) of the cyanine dye in the form of thin membrane at absorption maximum (about 450 nm) wavelength, the membrane was exposed to xenon lamp (light-irradiation energy of 180 W/m$^2$ on the plate surface) in the ventilation of cooled air while placing 7.5 W xenon lamp with a prescribed distance away from the glass plate, after which the membrane was immediately determined for optical transmittance (T) at absorption maximum wavelength. Thereafter, residual dye rate (%) was calculated by substituting the obtained optical transmittances (T and $T_0$) to Formula 1. In parallel, another thin membrane formed by cyanine dye represented by Chemical Formula 14 (Control 1), a additional thin membrane formed by cyanine dye represented by Chemical Formula 16 (Control 2), a further thin membrane formed by cyanine dye represented by Chemical Formula 14 and an equimolar azometallic complex represented by Chemical Formula 15 as an optical resistance-improving agent (Control 3), and one more additional thin membrane formed by cyanine dye represented by Chemical Formula 16 and an equimolar azometallic complex represented by Chemical Formula 15 as an optical resistance-improving agent (Control 4) were determined for optical resistance similarly as above. The results were as shown in Table 1.

TABLE 1

| Cyanine dye | Optical resistance-improving agent | Residual dye rate (%) | Remarks |
|---|---|---|---|
| Chemical Formula 1 | None | 99.3 | Present invention |
| Chemical Formula 9 | None | 99.5 | Present invention |
| Chemical Formula 14 | None | 29.3 | Control 1 |
| Chemical Formula 14 | Chemical Formula 15 | 91.7 | Control 2 |
| Chemical Formula 16 | None | 30.1 | Control 3 |
| Chemical Formula 16 | Chemical Formula 15 | 92.2 | Control 4 |

Formula 1:

$$\text{Residual dye rate}(\%) = \frac{100 - T}{100 - T_o} \times 100$$

As seen from the results in Table 1, in the cases of thin membranes of Control 1 and Control 3, formed by analogous compounds represented by Chemical Formula 14 or 16, remarkable amounts of the cyanine dyes were altered by exposure for only 5.5 hours to reduce their initial radiation-absorbing ability to 29.3% and 30.1%. In the cases of thin membranes of Control 2 and 4, formed from either of analogous compound represented by Chemical Formula 14 or 16 and an azometallic complex represented by Chemical Formula 15, their initial radiation-absorbing abilities were respectively reduced to 91.7% and 92.2% by the exposure in the same manner. While radiation-absorbing abilities of thin membranes formed with either cyanine dye of this invention represented by Chemical Formulae 1 and 9 were hardly reduced during the same exposure, marking to residual dye rates of 99.3% and 99.5%, respectively.

These experimental results demonstrate that the cyanine dye in this invention, which is formed by binding a cation of monomethine cyanine dye having a specific structure to an anion of an azometallic complex exhibits an remarkably superior optical resistance at the visible region, in comparison with analogous compounds, for example, those represented by Chemical Formulae 14 and 16 which bears an counter anions other than anions of a specific azometallic complex, and a mere mixture of such an analogous compound and an azometallic complex, for example, represented by Chemical Formula 15.

INDUSTRIAL APPLICABILITY

This invention is based on the creation of an entirely novel cyanine dye which has been never documented in literatures. Since the cyanine dye of this invention substantially absorbs a short-wavelength visible radiation efficiently, exhibits a large optical resistance and also in a variety of organic solvents a solubility which arises no practical obstacles, and exhibits a superior heat characteristic, it is very useful as radiation-absorbing organic material to shield visible radiation or to convert it into energy by absorption in a variety of fields of, for example, information storage, solar power generation, electric machinery apparatus, electric communication apparatus, optical apparatus, cloth, building/bedding/decorating product, sanitary and health product and agricultural material.

The invention claimed is:

1. A cyanine dye which is represented by Formula 1 and which exhibits an absorption maximum at a wavelength of longer than 400 nm but not higher than 550 nm and efficiently absorbs visible radiation ranging from 400 nm to 550 nm in the violet to green region in a solution and has a molar absorption coefficient ($\epsilon$) of at least $5\times10^4$ at the absorption maximum wavelength, and which has a residual dye rate (%) of at least 99.3% when determined on determining an optical transmittance ($T_0$) of said cyanine dye in the form of a thin membrane formed on a glass plate at an absorption maximum wavelength of about 450 nm, exposing said thin membrane to a 7.5 W xenon lamp with a light-irradiation energy of 180 w/m² on the surface of said glass plate for 5.5 hours in the ventilation of cooled air, determining an optical transmittance (T) at the absorption maximum wavelength, and calculating the residual dye rate (%) with the following equation:

$$\text{Residual dye rate (\%)} = \times 100 = \frac{100-T}{100-T_0} \times 100$$

Formula 1:

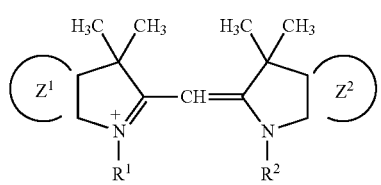

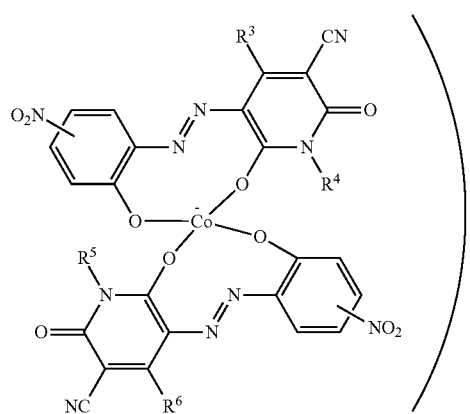

wherein in Formula 1, $Z^1$ and $Z^2$ mean monocyclic, condensed carbocyclic or heterocyclic aromatic rings which are the same or different from each other, and $R^1$ to $R^6$ independently denote aliphatic hydrocarbon groups which optionally bear a substituent.

2. The cyanine dye according to claim 1 selected from the group consisting of:

Chemical Formula 1:

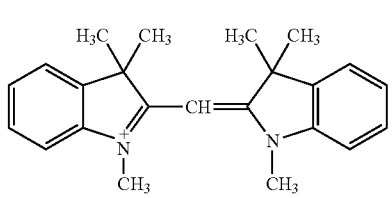

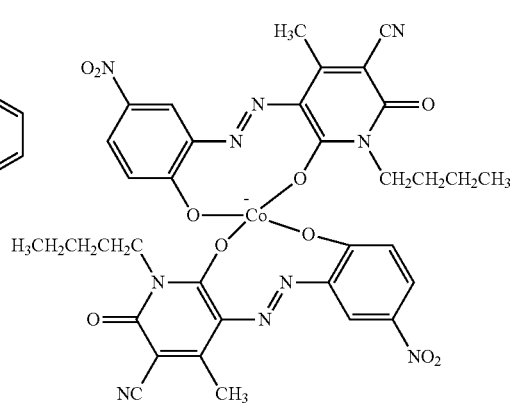

Chemical Formula 2:
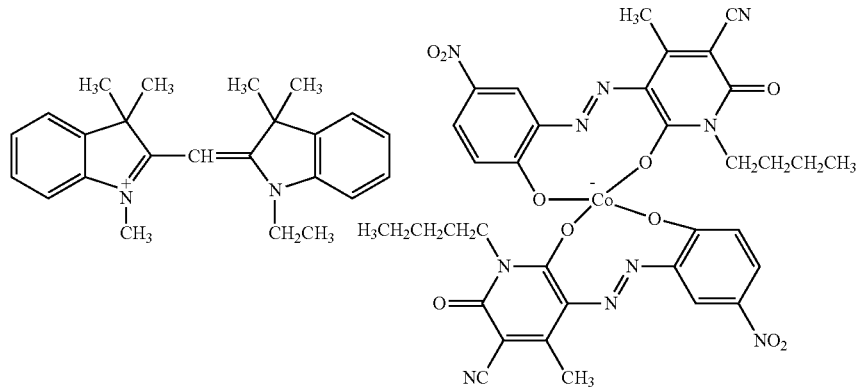
Chemical Formula 3:
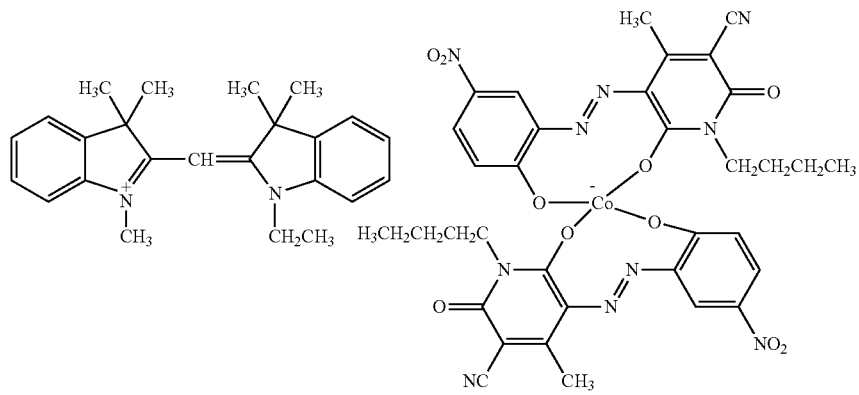
Chemical Formula 4:
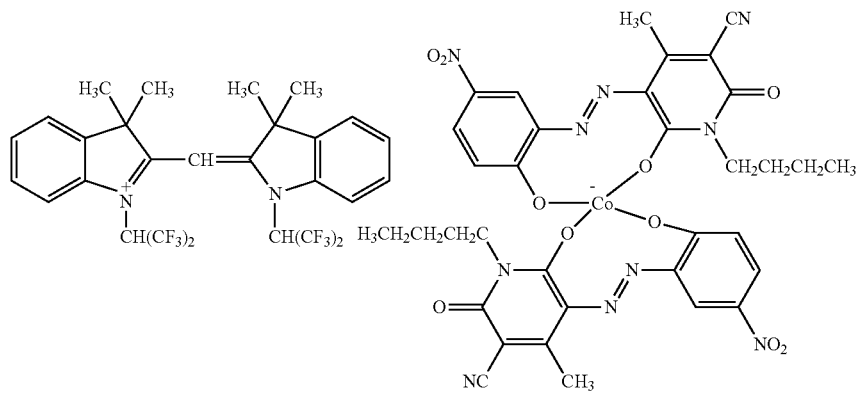
Chemical Formula 5:
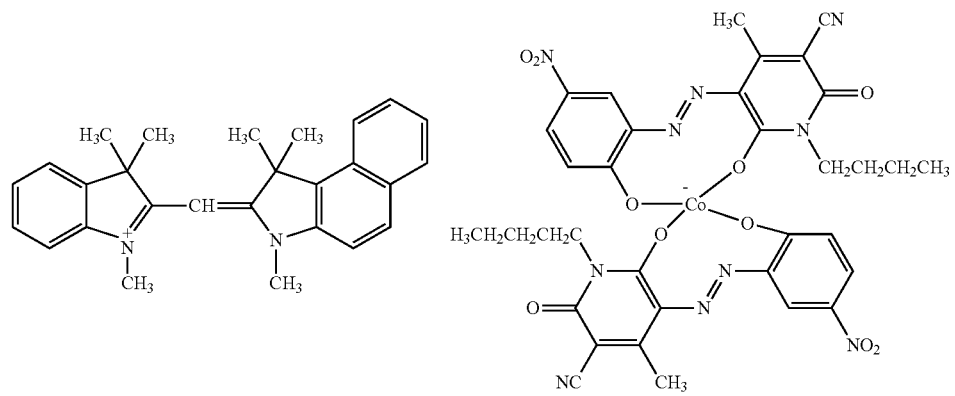

-continued
Chemical Formula 6:
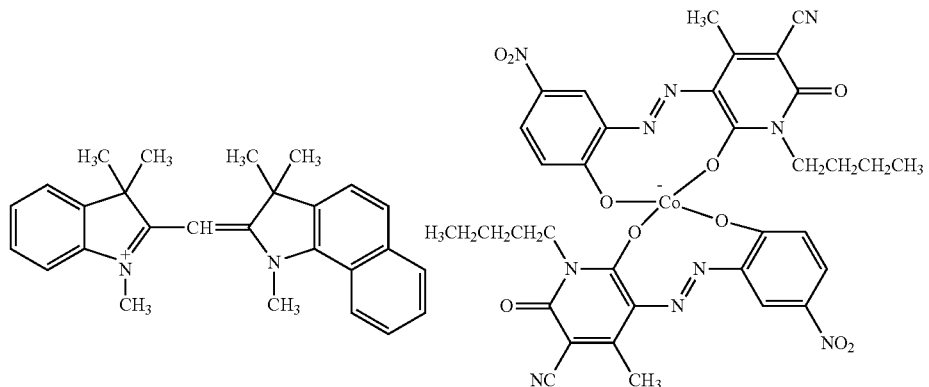
Chemical Formula 7:
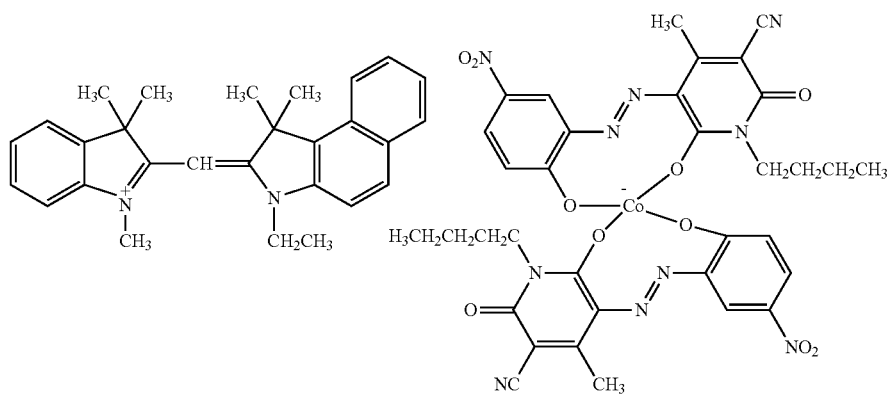
Chemical Formula 8:
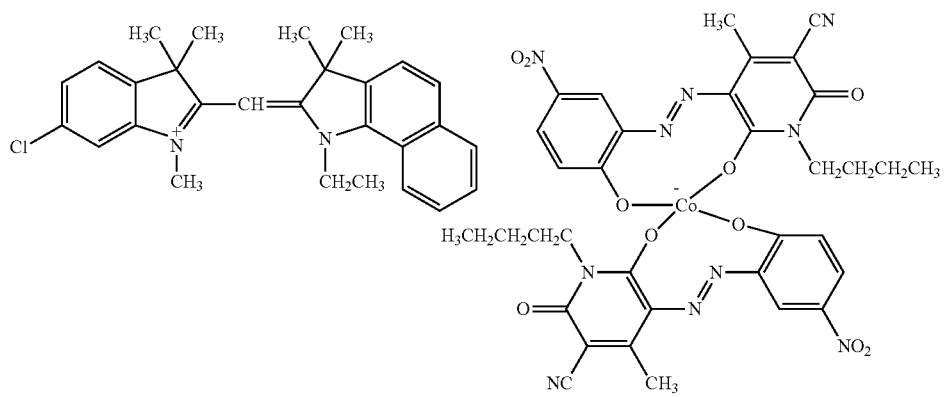
Chemical Formula 9:
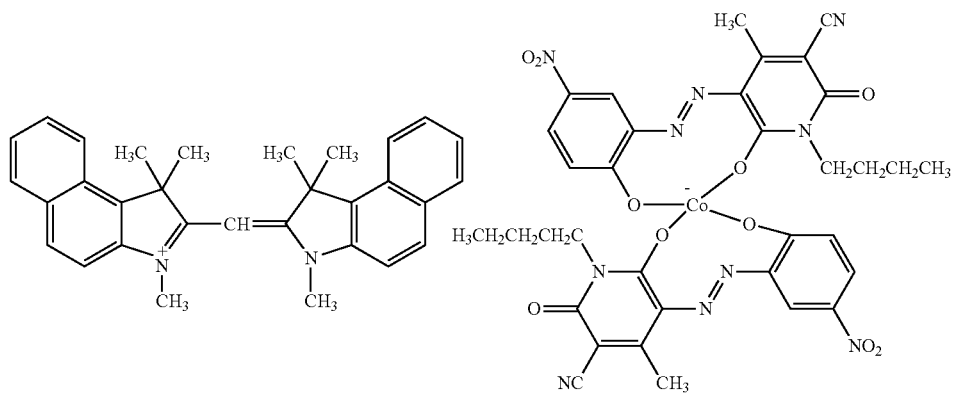

-continued
Chemical Formula 10:
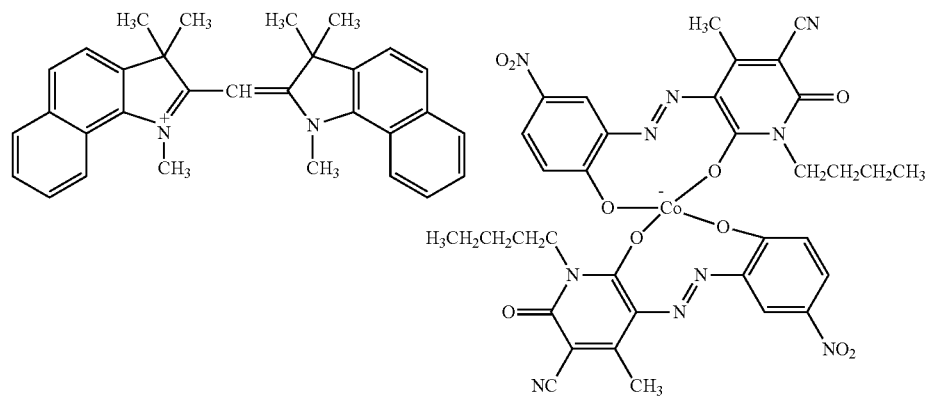
Chemical Formula 11:
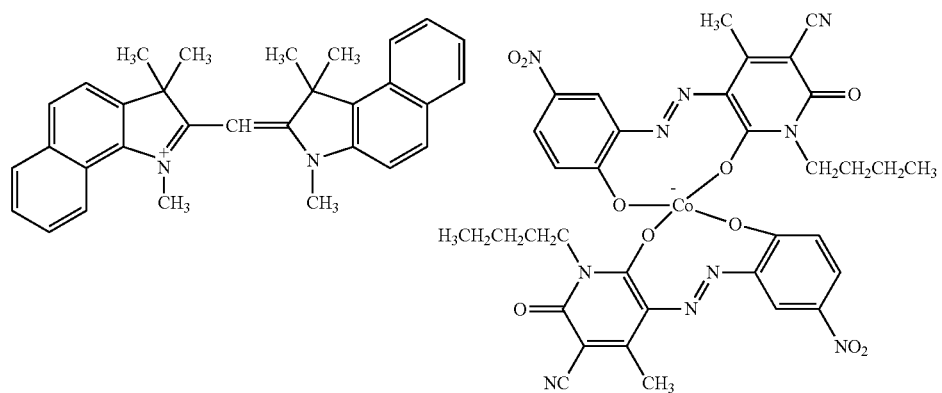
Chemical Formula 12:
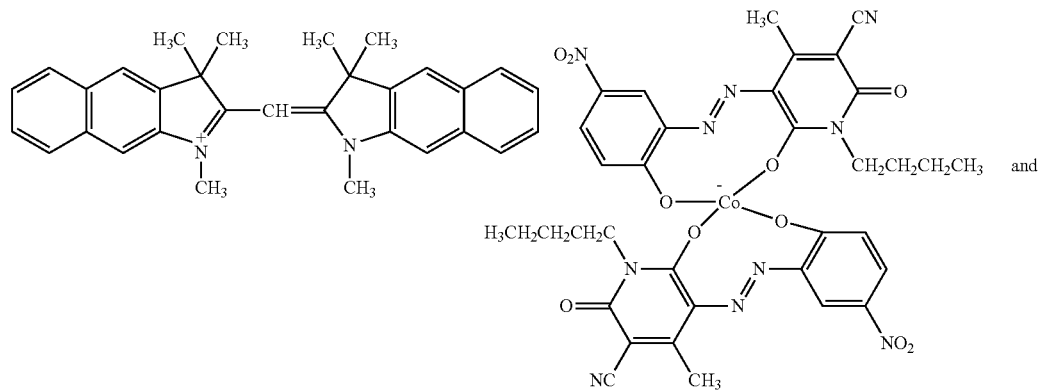
and Chemical Formula 13:
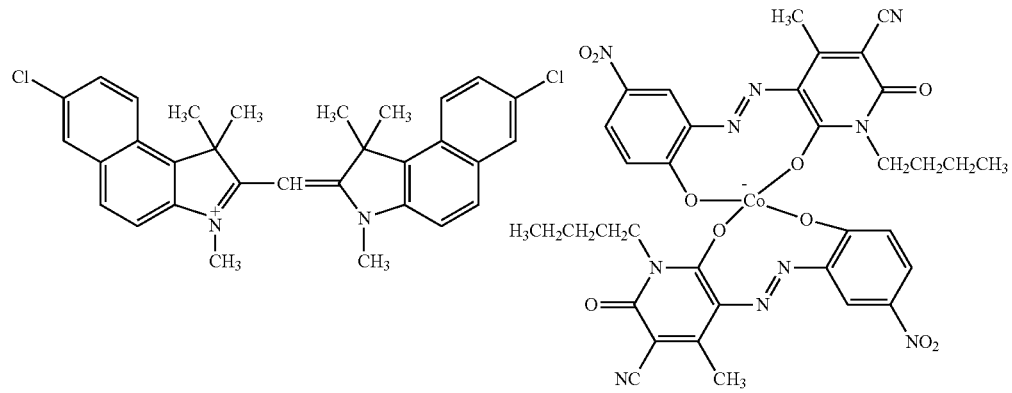
3. The cyanine dye according to claim 1 wherein the absorption maximum is about 430 to 550 nm.
* * * * *